United States Patent [19]

Loshaek et al.

[11] 4,158,089

[45] Jun. 12, 1979

[54] CONTACT LENSES OF HIGH WATER CONTENT

[75] Inventors: Samuel Loshaek; Chah Moh Shen, both of Chicago, Ill.

[73] Assignee: Wesley-Jessen Inc., Chicago, Ill.

[21] Appl. No.: 864,398

[22] Filed: Dec. 27, 1977

[51] Int. Cl.$^2$ .................. C08F 218/16; C08F 220/12; C08F 226/06; G02C 7/04

[52] U.S. Cl. .............................. 526/264; 351/160 H; 526/262; 526/263

[58] Field of Search .................... 526/264, 262, 263; 351/160

[56] References Cited

U.S. PATENT DOCUMENTS

| | | | |
|---|---|---|---|
| 2,831,836 | 4/1958 | Forchielli | 526/264 |
| 2,941,980 | 6/1960 | Robinson | 526/264 |
| 3,532,679 | 10/1970 | Steckler | 526/264 |
| 3,937,680 | 2/1976 | de Carle | 351/160 T |
| 3,949,021 | 4/1976 | Kunitomo et al. | 260/895 |
| 4,038,264 | 7/1977 | Rostoker et al. | 526/264 |

FOREIGN PATENT DOCUMENTS 1391438 4/1975 United Kingdom.
1468977 3/1977 United Kingdom.

*Primary Examiner*—Harry Wong, Jr.
*Attorney, Agent, or Firm*—Sigalos & Levine

[57] ABSTRACT

Contact lenses comprising hydrophilic units of which the only or major proportion are derived from an N-vinyl heterocyclic monomer hydrophobic units derived from a hydrophobic monomer, and allylic cross-linking units containing more than one polymerizable double bond selected from monoallyl itaconate, diallyl itaconate, triallyl cyanurate, triallyl isocyanurate, triallyl trimellitate, N,N-diallylmelamine, other multifunctional allyl monomers formed by the esterification of polybasic acids with allyl alcohol, or mixtures thereof; the proportions of said monomers being adjusted to give the desired water content and resistance to dissolution when the polymer is swollen to equilibrium in an aqueous environment.

8 Claims, No Drawings

CONTACT LENSES OF HIGH WATER CONTENT

BACKGROUND OF THE INVENTION

It is known in the ophthalmological field that oxygen from the air must be made available to the eye in order to provide for the physiological needs of the cornea. There is also the concomitant need for the carbon dioxide produced by corneal metabolic processes to be carried away from the cornea. The placement of a gas impermeable contact lens over the cornea can seriously inhibit the transmission of oxygen to it and result in corneal trauma. This situation has been partially alleviated by the so-called "pump" design of corneal contact lenses which serves to replace the lachrymal fluid under the lens containing carbon dioxide with freshly oxygenated lachrymal fluid and thereby make oxygen available to the cornea. The oxygen deficiency problem has been further alleviated by limiting the length of time for which an impermeable lens can be continuously worn, ranging from about four hours to 16 hours of daytime wear depending on the individual, and no wear during sleeping hours.

It is now known that hydrophilic contact lenses have gas permeability orders of magnitude greater than conventional hard polymethyl methacrylate lenses and, furthermore, the gas permeability generally increases with water content. The term "gas permeability" refers broadly to air, oxygen and carbon dioxide permeability. Thus, hydrophilic contact lenses with high water content are especially desirable. At sufficiently high water contents the increased gas permeability makes possible increased wearing times, even during sleeping hours. The practical use of hydrophilic contact lenses of high water content has, however, been severely limited hitherto because the strength (resistance to tearing, puncturing, etc.) of contact lenses made from high water content polymers, e.g., 70%–95% water, have been found to be low. Strength has been found to decrease progressively with increased water content. Polymers of the prior art which are of sufficiently high water content to give high gas permeabilities, e.g., about 60%–95% by weight of the combined weight of polymer plus water, and especially above about 70% water content, are very weak and are readily torn or otherwise physically damaged during handling. Such polymers are exemplified in British Pat. No. 1,391,438 and U.S. Pat. Nos. 3,639,524 and 3,943,045. These polymers are prepared from monomer compositions which contain a relatively high amount of cross-linking monomer, the latter being required to prevent the hydrophilic polymer from substantially dissolving in aqueous media. This excessive cross-linking frequently results in a weak polymer. Such high water content hydrophilic polymers are sometimes so fragile that contact lenses made therefrom can only be inserted and removed by a professional practitioner.

Further, the high water content lenses of the prior art cannot withstand repeated heat disinfection, heat sterilization, or cleaning without deterioration or destruction of the lens.

It has not been possible heretofore to have hydrophilic polymers from which strong hydrophilic gel contact lenses of high water content and gas permeability can be made, which lenses can be repeatedly cleaned, disinfected, or sterilized by thermal means or by chemical means without damage to their optical or physical properties.

SUMMARY OF THE INVENTION

The present invention provides improved hydrophilic interpolymers and hydrophilic gel contact lenses made therefrom of up to about 95% water content having excellent optical properties which are strong and which can be repeatedly subjected to thermal, chemical, or physical treatment for cleaning, disinfection, or sterilization without damage.

Briefly stated, the present invention comprises a cross-linked hydrophilic interpolymer comprising hydrophilic units of which the only or major proportion are derived from an N-vinyl heterocyclic monomer; derived from allylic monomers cross-linking units containing more than one polymerizable double bond selected from monoallyl itaconate, diallyl itaconate, triallyl cyanurate, triallyl isocyanurate, triallyl trimellitate, N,N-diallylmelamine, multifunctional allyl monomers formed by the esterification of polybasic acids with allyl alcohol, or mixtures thereof; and optionally hydrophobic units derived from a hydrophobic monomer; the proportions of said monomers being adjusted to give the desired water content and resistance to dissolution when the polymer is swollen to equilibrium in an aqueous environment. The invention also relates to corneal contact lenses made from such polymers. Preferably, the interpolymers, and lenses made therefrom contain a hydrophobic monomer and for maximum strength there is used the maximum amount of hydrophobic monomer and minimum amount of cross-linking monomer consistent with the desired water content and resistance to dissolution of the polymer.

The hydrophilic polymers of the invention consist of a major proportion of hydrophilic units derived from an N-vinyl heterocyclic monomer, the preferred monomer being N-vinyl pyrrolidone, optionally a minor proportion of hydrophilic units derived from other hydrophilic monomers such as hydroxy alkyl acrylates and methacrylates, acrylic and methacrylic acids, itaconic acid, maleic acid and fumaric acid and allylic cross-linking units selected from the group consisting of allyl esters derived from the esterification of polybasic acids with allyl alcohol, monoallyl itaconate, triallyl cyanurate and N,N-diallylmelamine, the preferred cross-linking monomer being dially itaconate which contains a polymerizable vinyl double bond in addition to two allyl bonds.

The proportions of the hydrophilic monomers, hydrophobic monomers, if any, and cross-linking monomers are adjusted to give the desired water content when the polymer is swollen to equilibrium in an aqueous environment. It has been found that the maximum strength for the hydrophilic polymer is obtained when there is used about the maximum amount of hydrophobic monomer and minimum amount of cross-linking monomer consistent with the desired water content and resistance to dissolution of the polymer. The cross-linking monomer must be efficient enough to provide a polymer gel network when used at low concentrations, to prevent dissolution of the polymer in the aqueous medium. A certain amount of dissolution of the polymer is permissible, provided the dissolution reaches a distinct end point. Generally, higher amounts of cross-linking monomer are required as the amount of hydrophobic monomer decreases.

DETAILED DESCRIPTION OF INVENTION

In making a hydrophilic gel contact lens which utilizes the present invention, the hydrophilic interpolymer is made by polymerizing the monomeric ingredients in bulk (with no solvent), preferably in a container such that the resultant interpolymer will be in the form of a solid rod from which can be sliced cylindrical buttons or other convenient shapes conventionally used in making contact lenses. The buttons are shaped into a contact lens on a lathe, thereafter polished, and then the contact lens is hydrated in an aqueous medium such as a normal saline solution. The invention provides improved interpolymers and contact lenses made therefrom which in the water content range of 60%–95% are flexible and much stronger than prior art hydrophilic polymers of this high water content. Interpolymers of 20%–60% water content can also be made in accordance with the present invention and these materials are less flexible and very strong.

Broadly, the interpolymers contain hydrophilic units the major proportion of said units being derived from a heterocyclic N-vinyl monomer, optionally, and preferably, hydrophobic units derived from a hydrophobic monomer, and cross-linking units derived from certain allylic cross-linking monomers containing more than one polymerizeable double bond therein. Small amounts of hydrophilic units derived from other hydrophilic monomers may be added to modify the properties of the interpolymer. The specific monomers and their range of proportions in the polymer are more fully described below.

Suitable hydrophilic N-vinyl heterocyclic monomers are N-vinyl pyrrolidones, N-vinyl succinimide, N-vinyl-ε-caprolactam, N-vinyl pyridine and N-vinyl glutarimide. Of the foregoing, the preferred hydrophilic N-vinyl heterocyclic monomer is N-vinyl-2 pyrrolidone. The foregoing heterocyclic monomers may be used alone or in combination.

The concentration (percent by weight based on the total monomer weight exclusive of cross-linking monomer) of N-vinyl heterocyclic monomer used to make the hydrophilic interpolymer, will depend on the water content desired in the swollen gel at equilibrium and the amounts of cross-linking monomer used. When a hydrophobic monomer such as methylmethacrylate is used with cross-linking monomer in the range of 0.10 to 1%, the N-vinyl heterocyclic monomer will range from about 40% for about a 30% water content gel, to about 95% for about a 95% water content gel, the amounts being somewhat less at lower cross-linking monomer amounts and somewhat more at higher amounts of the latter. A minor portion of the N-vinyl heterocyclic may be substituted with other hydrophilic monomers for specific property modifications of the interpolymer as discussed below.

Other auxiliary hydrophilic monomers which may be used include the hydroxyalkyl esters of acrylic and methacrylic acids, such as hydroxyethyl acrylate and methacrylate and hydroxypropyl methacrylate, and acrylic, methacrylic, itaconic, fumaric and maleic acids and other olefinic acids which can be copolymerized by free radical mechanism with the other monomers in the interpolymer. The use of small amounts of copolymerizeable acids, e.g., up to 5%, has been found to sharply increase the water content of the interpolymer and there is an enhancement of its clarity as compared to an interpolymer of the same water content without such acid.

Examples of suitable allylic cross-linking monomers are diallyl itaconate, monallyl itaconate, mixtures of the mono and diallyl itaconates, triallyl cyanurate, triallyl isocyanurate, triallyl trimellitate, N,N-diallylmelamine, and multifunctional allyl monomers formed by the esterification of polybasic acids with allyl alcohol; examples of the latter allyl monomers being diallyl maleate, diallyl fumarate, dimethallyl maleate, diallyl oxalate, diallyl adipate, diallyl succinate, diallyl azelate, diallyl phthalate, and diallyl isophthalate. Combinations of the foregoing monomers may be used. The preferred cross-linking monomer is diallyl itaconate.

The concentration (percent by weight based on the total weight of monomers exclusive of cross-linking monomer) at which the cross-linking monomers are used in interpolymers containing a hydrophobic comonomer, range from about 0.01% to about 2% depending on the water content desired. For high water contents in the range of 70%–95%, the preferred concentration range of cross-linking monomer is from about 0.01% to about 0.5%. Where essentially none or very low hydrophobic comonomer is used, a concentration range of about 1% to 10% may be employed, with about 5% being the preferred amount. It has been found that the strongest most extensible polymeric gels at a given water content are obtained if the interpolymer contains a combination of about the maximum amount of hydrophobic monomer and about the minimum amount of cross-linking monomer which will give that water content.

Suitable hydrophobic monomers are the olefinically unsaturated alkyl esters of acrylic and methacrylic acid, e.g., methyl, ethyl and butyl methacrylates and acrylates. The percentage by weight (based on the total weight of monomers exclusive of the cross-linking monomer) of hydrophobic monomer used, will depend on the desired water content of the polymeric gel.

When methyl methacrylate is used as the hydrophobic monomer and the concentration of cross-linking monomer is in the range of 0.1 to 0.5%, about 60% is used to give a polymeric gel of about 30% water content and about 5%–10% is used to give a polymeric gel of about 90%–95% water content.

The interpolymers of the invention are formed by the use of conventional free radical polymerization procedures. Typical free radical initiators can be used. Examples are benzoyl peroxide, di-t-butyl peroxide, t-butyl perbenzoate, (2,5-dimethyl-2,5-bis(2-ethyl hexoyl peroxy)hexane)lauroyl peroxide, t-butyl hydroperoxide, azobisisobutyronitrile, diisopropyl peroxydicarbonate, t-butylperoxypivalate, and the like. The amounts employed are conventional and such as to give a controlled polymerization at conventional polymerization temperatures. The exact polymerization method and conditions are not intended to limit the scope of the present novel polymers and contact lenses.

The polymers of the invention and more particularly the lenses made therefrom, can be suitably graded as to physical durability on the basis of their tensile strength and extensibility at break. The latter tests are suitably performed by a simple hand pull test combined with a measurement of extensibility at break as hereinafter described. The tensile strength at break is a qualitative measurement and the result is given as a rating against a standard lens. It has been found that trained observers can make consistent strength ratings. An optimum type of lens is one which has both high extensibility and high strength at break. However, lenses with reasonable extensibility and strength are also useful. A lens with low extensibility but very high strength would also be suitable since such a lens would not be easily damaged in use. The nonextensible, weak lenses break immediately with the application of a moderate pulling force with very little or no extension and these are not desirable. The foregoing tests are particularly applicable to materials of high water content in the 70%–95% water content range. Materials in the lower water content range such as below about 60% are less flexible and are inherently strong enough so that they cannot readily be pulled and extended by a simple hand test.

The efficiency of the cross-linking monomer may be characterized by the concentration at which it must be employed in the hydrophilic interpolymer to produce a cross-linked structure which is not dissolved away in its aqueous environment when used as a contact lens in the eye. The lower the concentration of cross-linking monomer required to provide such a cohesive cross-linked structure, the greater is considered to be its efficiency. A suitable measure of efficiency is provided by measuring the percentage by weight of material which is extracted from the cross-linked interpolymer in an aqueous extracting medium, under some standard conditions of temperature and time. An experimental procedure for evaluating such polymeric gels is described in greater detail later herein and consists of carrying out successive extractions on the same sample and measuring the percentage weight loss after each extraction. For a material to be useable for making a contact lens the weight loss should approach zero after a few such extractions. If the extractibles from a given gel do not approach zero, then it can be expected that the contact lens made from such a material will gradually waste away since at all times in use it is being exposed to an aqueous medium whether in storage or in the eye. Polymers with extractibles as high as 50%–60% may be suitable provided that the state of zero extraction is reached.

Strong hydrophilic gel contact lenses are made practical by the improved hydrophilic polymers of this invention which give high water content gels of concomittantly high gas permeability. These contact lenses are particularly adapted and useful for extended continuous daytime wear and even through sleeping hours for many individuals. The polymers and contact lenses made therefrom also have all the other attributes of a good hydrophilic soft lens material, such as, durability, optical clarity, dimensional stability, good machineability in the dry polymer state, comfort of the lens for extended time periods of wear, ability to be disinfected by thermal or chemical means, ability to be sterilized by thermal means, cleanability and the like. Also, the lens can withstand some abuse and be readily handled by the patient without damaging it.

The contact lenses can be formed from the unhydrated hydrophilic polymer by any of the conventional lens lathing and polishing processes, followed by any of the conventional hydration procedures used in this art.

The invention will be further described in connection with the following examples which are given for purposes of illustration only and in which proportions are by weight unless expressly stated to the contrary.

The polymerization and hydration-extraction procedure used to make the interpolymers and polymeric gels and the physical tests used to evaluate the polymers of the examples were as follows:

A. POLYMERIZATION PROCEDURE

The monomers, cross-linker, and initiator, 0.4% of 2,5-dimethyl-(2,5-bis(2-ethyl hexoyl peroxy)hexane), based on the weight of the monomers exclusive of cross-linking monomer, were weighed in a flask mixed, and deaerated for 15 minutes. The mixture was then poured into a 25 mm diameter test tube within 1 cm from the top, sealed with a cap and placed in a 35° C. water bath. The tube was maintained in the bath for three days beyond the time that gelation of the monomers took place. The tube was then removed from the bath and heated in an oven at 50° C. for 24 hours, 70° for 4 hours, and finally at 110° for two hours. The heat was then turned off and the tube cooled gradually to room temperature. The glass tube was then broken and a solid rod of polymer was obtained.

B. HYDRATION-EXTRACTION PROCEDURE

Cylindrical discs of 0.4 inch×0.05 inch thickness were cut from each rod and sanded smooth. The weighed discs (dry weight) were placed in an aqueous hydration medium at 95° C. for four hours, then cooled to room temperature. The discs were then placed in an aqueous medium for seven days, whereupon the wet weight of the discs was determined. After drying at 110° C. overnight the discs were weighed again to give the redry weight. The water content in percent is calculated from $100\times$ (wet. wt.—redry wt.)/(wet wt.) and the extractible in percent is given by $100\times$ (dry wt.—redry wt.)/(dry wt.). The hydration-extractions were repeated until no further substantial weight loss occurred, usually two or three extractions.

C. OXYGEN PERMEABILITY

The oxygen permeability of each material was measured on hydrated lenses. An oxygen flux meter was used. The details of this measurement is described in "Polarographic Oxygen Sensors" by I. Fatt, published by CRC Press, 1976. This meter provides an electric current reading which is proportional to the amount of oxygen passing through the lens. The permeability units set forth in Table I below are in:

$$\frac{cm^2}{sec} \frac{ml\ O_2 \times 10^{11}}{ml\ mm\ Hg}$$

D. STRENGTH RATING

Hand pull tests were performed on hydrated contact lenses of 0.2 mm center thickness and 14 mms diameter. The lens was grasped by both hands between thumb and forefinger so that there was about a 7 mm distance between the thumbs. The lens was pulled over a scale graduated in mms and the elongation at break is noted. The percent elongation is the ratio of the final length over the original length multiplied by 100. The control lens was a commercial gel lens of the polyhydroxyethyl methacrylate type (tradename DuraSoft) of 0.2 mm center thickness and 30% water content. Its strength rating is 10 on a scale of 0 to 10 which corresponds to about 10 kg/cm$^2$ tensile strength and its elongation at break is about 400%. Lenses with strength ratings of about 2–3 together with an elongation at break of 40%–300% are typical examples of useful lenses.

Higher ratings are advantageous and somewhat lower ratings may still be acceptable if the lens has other special attributes such as very high oxygen permeability. At water contents below about 70%, the lenses are too strong and rigid to be pulled by hand and rated according to this scheme. Such lenses are simply characterized as rigid or very rigid. Such lenses may be useful for other than long extended wear applications.

The composition of polymers is given in percent by weight of the monomers in the interpolymers exclusive of the cross-linking monomer. The amount of cross-linking monomer is in percent by weight based on 100 parts of the polymer exclusive of the cross-linking monomer.

EXAMPLES 1 TO 16

A series of interpolymers and lenses were made and tested as described above having varying compositions. The composition of each polymer and test results are set forth in Table I in which vinyl pyrrolidone is abbreviated as VP, methyl methacrylate as MMA, and diallyl itaconate as DAI.

EXAMPLE 22

Example 18 was repeated with the exception that the methacrylic acid was replaced separately and in turn with an equal weight of itaconic acid, fumaric acid, maleic acid, and crotonic acid. Similar polymers were obtained.

EXAMPLE 23

Example 8 was repeated with the exception that 10 parts of the vinyl pyrrolidone were replaced with hydroxyethyl methacrylate. A suitable interpolymer of 80% water content was obtained.

EXAMPLE 24

Example 8 was repeated with the exception that the cross-linking monomer DAI was replaced separately and in turn, with monoallyl itaconate and a mixture of 80% diallyl and 20% monoallyl itaconate. Suitable polymers were obtained in each case.

TABLE I

| Example No. | Water Content % | Composition (% by Wt.) VP | MMA | DAI | Permeability | % Extractibles[1] | Strength Rating | % Extensibility |
|---|---|---|---|---|---|---|---|---|
| 1 | 98 | 100 | 0 | 0.05 | 66 | 20 | 1 | 40 |
| 2 | 83 | 100 | 0 | 1.00 | 33 | 14 | 2 | 40 |
| 3 | 57 | 100 | 0 | 5.00 | 12 | 6 | 5 | 40 |
| 4 | 94 | 95 | 5 | 0.05 | 54 | 13 | 1 | 40 |
| 5 | 90 | 90 | 10 | 0.05 | 48 | 14 | 2–3 | 160 |
| 6 | 90 | 95 | 5 | 0.20 | 44 | 10 | 1–2 | 40 |
| 7 | 83 | 80 | 20 | 0.10 | 33 | 10 | 4 | 240 |
| 8 | 83 | 85 | 15 | 0.15 | 34 | 12 | 2–3 | 80 |
| 9 | 80 | 85 | 15 | 0.50 | 31 | 12 | 3–4 | 100 |
| 10 | 74 | 70 | 30 | 0.05 | 23 | 10 | 8 | 160 |
| 11 | 73 | 95 | 5 | 2.00 | 23 | 9 | 2 | 100 |
| 12 | 71 | 80 | 20 | 1.00 | 20 | 8 | 3 | 40 |
| 13 | 60 | 60 | 40 | 0.10 | 13 | 9 | — | rigid[2] |
| 14 | 33 | 40 | 60 | 0.05 | 4 | 6 | — | very rigid[2] |
| 15 | 20 | 25 | 75 | 0.05 | 1 | 2 | — | very rigid[2] |
| 16 | 30 | DuraSoft Lens (control) | | 0.05 | 4 | 3 | 10 | 400 |

[1]Percent by weight extracted from the polymer usually after three extractions--no substantial increase in extractibles was noted between the last and next-to-last extraction.
[2]Lens did not break during hand pull.

EXAMPLES 17 TO 20

The interpolymers of these examples were made and tested as described above and included methacrylic acid (MAA). The compositions and results are set forth in Table II.

EXAMPLE 25

Example 8 was repeated with the exception that the 0.1 parts of DAI was replaced, separately and in turn, with 0.3 parts of each of the following: diallyl succinate, diallyl adipate, diallyl phthalate, diallyl isophthalate, diallyl maleate, and diallyl fumarate. Suitable polymers with comparable water contents were obtained but with higher extractibles and lower strengths.

TABLE II

| Example No. | Water Content % | Composition (% by Wt.) VP | MMA | MAA | DAI | Permeability | % Extractibles[1] | Strength Rating | % Extensibility |
|---|---|---|---|---|---|---|---|---|---|
| 17 | 80 | 60 | 40 | 5 | 0.1 | 31 | 14 | 4 | 150 |
| 18 | 87 | 71 | 25 | 4 | 0.1 | 43 | 13 | 2 | 60 |
| 19 | 85 | 72 | 25 | 3 | 0.1 | 39 | 12 | 3 | 120 |
| 20 | 80 | 76 | 24 | 0.5 | 0.1 | 32 | 12 | 4 | 120 |

[1]Percent by weight extracted from the polymer usually after three extractions--no substantial increase in extractibles was noted between the last and next-to-last extraction.

EXAMPLE 21

Example 18 was repeated with the exception that the methacrylic acid was replaced with an equal weight of acrylic acid. A similar polymer was obtained.

EXAMPLE 26

Example 8 was repeated with the exception that the 0.1 parts of DAI was replaced, separately and in turn, with 0.5 parts of triallyl cyanurate and N,N-diallyl melamine. Polymers of slightly higher water content were obtained but with higher extractibles and lower strength.

EXAMPLE 27

Example 8 was repeated with the exception that the vinyl pyrrolidone was replaced, separately and in turn, with an equivalent weight of N-vinyl succinimide, N-vinyl caprolactam, N-vinyl pyridine, and N-vinyl glutarimide. In each instance, suitable hydrophilic polymers were obtained.

EXAMPLE 28

The polymerization procedure set forth above was used to prepare the compositions of Examples 7 and 12 except that the initiator was replaced, separately and in turn, with 0.3% of 2-bisazoisobutyronitrile and 0.3% of benzoyl peroxide. Interpolymers with equivalent properties were obtained.

EXAMPLE 29

A pair of contact lenses of appropriate base curve radius, diameter and optometric specifications was prepared from the composition of Example 8 by lathing. The lenses were hydrated according to the procedure set forth above. The resulting lenses when placed on a patient's eyes provided excellent comfort and vision, and after proper adaptation, the lenses could be worn continuously for up to several weeks without removing them.

While the invention has been described in connection with preferred embodiments, it is not intended to limit the invention to particular forms set forth, but, on the contrary, it is intended to cover such alternatives, modifications and equivalents as may be included within the spirit and scope of the invention as defined by the appended claims.

What is claimed is:

1. A contact lens of about 60% to 95% water content having an oxygen permeability constant of at least about 10 in units of $$\frac{cm^2 \; ml \; O_2 \times 10^{11}}{sec \; ml \; mm \; Hg},$$

a tensile strength of at least about 2 Kg/cm$^2$, and an elongation at break of at least 40% consisting essentially of the polymerization reaction product of monomers consisting essentially of:

(1) from 70% to 95% by weight of hydrophilic monomers of which at least 90% are selected from N-vinyl pyrrolidones, N-vinyl succinimide, N-vinyl-ε-caprolactam, N-vinyl pyridine, N-vinyl glutarimide, or mixtures thereof, (2) from 5% to 30% by weight of hydrophobic monomers of which at least 75% by weight are selected from alkyl esters of methacrylic, acrylic acids, or mixtures thereof, and (3) from 0.01% to 5% by weight, based on total combined weight of monomers 1 and 2, of at least one cross-linking monomer comprising an allylic monomer having more than one polymerizable double bond selected from monoallyl itaconate, diallyl itaconate, triallyl cyanurate, triallyl isocyanurate, triallyl trimellitate, N,N-diallylmelamine, or other multifunctional allyl monomers formed by the esterification of polybasic acids with allyl alcohol, or mixtures thereof.

2. The contact lens of claim 1 wherein the alkyl esters are C$_1$-C$_4$ alkyl esters of acrylic or methacrylic acid, or mixtures thereof.

3. The contact lens of claim 1 wherein the N-vinyl pyrrolidone is N-vinyl-2-pyrrolidone.

4. The contact lens of claim 1 wherein the hydrophylic monomer consists of at least 90% by weight of N-vinyl-2-pyrrolidone and up to 10% by weight of a hydrophilic monomer selected from the C$_1$-C$_4$ hydroxyalkyl esters of acrylic or methacrylic acid or olefinic acids which can be copolymerized by free radical polymerization with the other monomers in the interpolymer.

5. The contact lens of claim 1 wherein the N-vinyl-pyrrolidone is N-vinyl-2-pyrrolidone, the hydrophobic ester is methyl methacrylate, and the cross-linking monomer is diallyl itaconate.

6. The contact lens of claim 5 wherein the water content is from about 80 to 85%, the N-vinyl-2-pyrrolidone is from about 80% to 90% by weight, the methyl methacrylate is from about 10% to 20% by weight, and the diallyl itaconate is from about 0.1% to 0.5% by weight.

7. The contact lens of claim 1, wherein the cross-linking monomer consists of at least two cross-linking monomers, at least 80% of the total weight of said cross-linking monomers being diallyl itaconate.

8. The contact lens of claim 7 wherein the water content is about 83%, the N-vinyl-2-pyrrolidone is about 85%, the methyl methacrylate is about 15%, and the diallyl itaconate is about 0.15%.

* * * * *